United States Patent
Otto et al.

[11] Patent Number: 6,122,359
[45] Date of Patent: Sep. 19, 2000

[54] SYSTEM FOR COORDINATING CALLS BETWEEN AN ADJUNCT DEVICE AND A SWITCHING SYSTEM

[75] Inventors: Mary Rita Otto, Lisle; Wayne Alan Senneke, Aurora, both of Ill.; Mark Aaron Yaphe, Toronto, Canada

[73] Assignee: Lucent Technologies Inc., Murray Hill, N.J.

[21] Appl. No.: 08/923,315

[22] Filed: Sep. 4, 1997

[51] Int. Cl.[7] .................................................. H04M 3/50
[52] U.S. Cl. ......................... 379/210; 379/211; 379/265; 379/266
[58] Field of Search .................................... 379/229, 230, 379/207, 219, 220, 212, 211, 210, 265, 266

[56] References Cited

U.S. PATENT DOCUMENTS

| | | | |
|---|---|---|---|
| Re. 35,758 | 3/1998 | Winter et al. ................................ | 379/88 |
| 4,878,240 | 10/1989 | Lin et al .................................. | 379/269 |
| 5,008,930 | 4/1991 | Gawrys ..................................... | 379/210 |
| 5,444,774 | 8/1995 | Friedes ..................................... | 379/266 |
| 5,533,115 | 7/1996 | Hollenbach et al. ..................... | 379/220 |
| 5,694,459 | 12/1997 | Backaus et al. ......................... | 379/427 |
| 5,867,494 | 2/1999 | Krishnaswamy et al. .............. | 379/114 |
| 5,917,903 | 6/1999 | Jolissaint ................................. | 379/265 |
| 5,926,754 | 7/1999 | Cirelli et al. ............................ | 455/414 |
| 5,937,051 | 8/1999 | Hurd et al. .............................. | 379/212 |
| 5,974,142 | 10/1999 | Heer et al. ............................... | 380/9 |

*Primary Examiner*—Harry S. Hong
*Assistant Examiner*—William J. Deane, Jr.
*Attorney, Agent, or Firm*—Jack R. Penrod; Dennis J. Williamson

[57] ABSTRACT

In the system of the invention the adjunct device is connected to the switching system over two connections. The first connection is a voice channel consisting of an analog line capable of transmitting voice but not call data such as called party number, calling party number or the like. The second connection is a data connection via an Ethernet channel between the switch and adjunct that transmits call data but is incapable of transmitting voice. The call data is logically associated with the voice call at both the adjunct and switching system. As a result, transaction data related to a voice call can be forwarded to an agent station or other terminal when the voice call is transferred from the adjunct to the agent station. This system eliminates the need to recreate the transaction data when a call is transferred while using inexpensive analog connections for the voice call.

11 Claims, 3 Drawing Sheets

SYSTEM FOR COORDINATING CALLS BETWEEN AN ADJUNCT DEVICE AND A SWITCHING SYSTEM

BACKGROUND OF THE INVENTION

The invention relates generally to telecommunications networks and, more particularly, to a system for coordinating calls between an adjunct device and a switching system.

It will be understood that the typical telecommunications network consists of a switching system connected to other switching systems in the network where selected ones of the switching systems are connected to customer premise equipment (CPE) such as telephone sets, personal computers, terminals and the like such that the CPE can be connected via the switched network. It is known in the art to provide voice response systems as adjuncts to the switching systems. One use for such voice response systems is to handle relatively large call volumes for commercial enterprises to provide voice interactive services with a calling party. Such systems are used to answer calls to "help" lines or for customer service requests such as commonly found with large institutions such as banks, airlines, or the like. A calling party is connected to the voice response system via the switched network and interacts with the voice response system using voice recognition technology or by inputting information using a telephone keypad or the like. The voice response system may access an associated mainframe or server network and data bases to obtain relevant calling party information.

Adjuncts such as voice response systems, automated response units, or interactive voice response systems are connected to the switching system over a voice interface such as an analog line, digital line such as T1, Primary Rate Interface (PRI), Basic Rate Interface (BRI) or the like. The analog line provides a low cost connection for voice but is incapable of transmitting data such as called party number, directory number, or calling party number to the adjunct. It is possible to use a digital connection between the switch and adjunct to transmit both voice and data; however, digital connections are relatively expensive and not all allow call transfers.

In either network arrangement, a problem exists when it becomes necessary to transfer a calling party from the voice response system to an agent station for further action. In such situations, because the voice response system began processing the call, it typically will have obtained relevant transaction information from the calling party and the mainframe data base. When the call is transferred to the agent station, existing voice response systems cannot forward the gathered transaction information to the agent station because these systems cannot correlate the original call between the calling party and the voice response system with the new call between the calling party and the agent station. As a result, the calling party and agent must recreate the process previously performed by the voice response system in order to obtain relevant information from the calling party and data base. As will be apparent, this duplication of effort wastes time and resources and can cause frustration for the calling party.

Thus, a voice response system in which the information gathered by the voice response system can be associated with and transferred to a subsequent agent station is desired.

SUMMARY OF THE INVENTION

In the system of the invention the adjunct device is connected to the switching system over two connections. The first connection is a voice channel consisting of an analog line capable of transmitting voice but not call data such as called party number, calling party number or the like. The second connection is a data connection via an Ethernet channel between the switch and adjunct that transmits call data but is incapable of transmitting voice. The call data is logically associated with the voice call at both the adjunct and switching system. As a result, transaction data related to a voice call can be redirected to an agent station or other terminal when the voice call is redirected from the adjunct to the agent station. This system eliminates the need to recreate the transaction data when a call is transferred while using inexpensive analog connections for the voice call.

DESCRIPTION OF THE INVENTION

Figure 1:
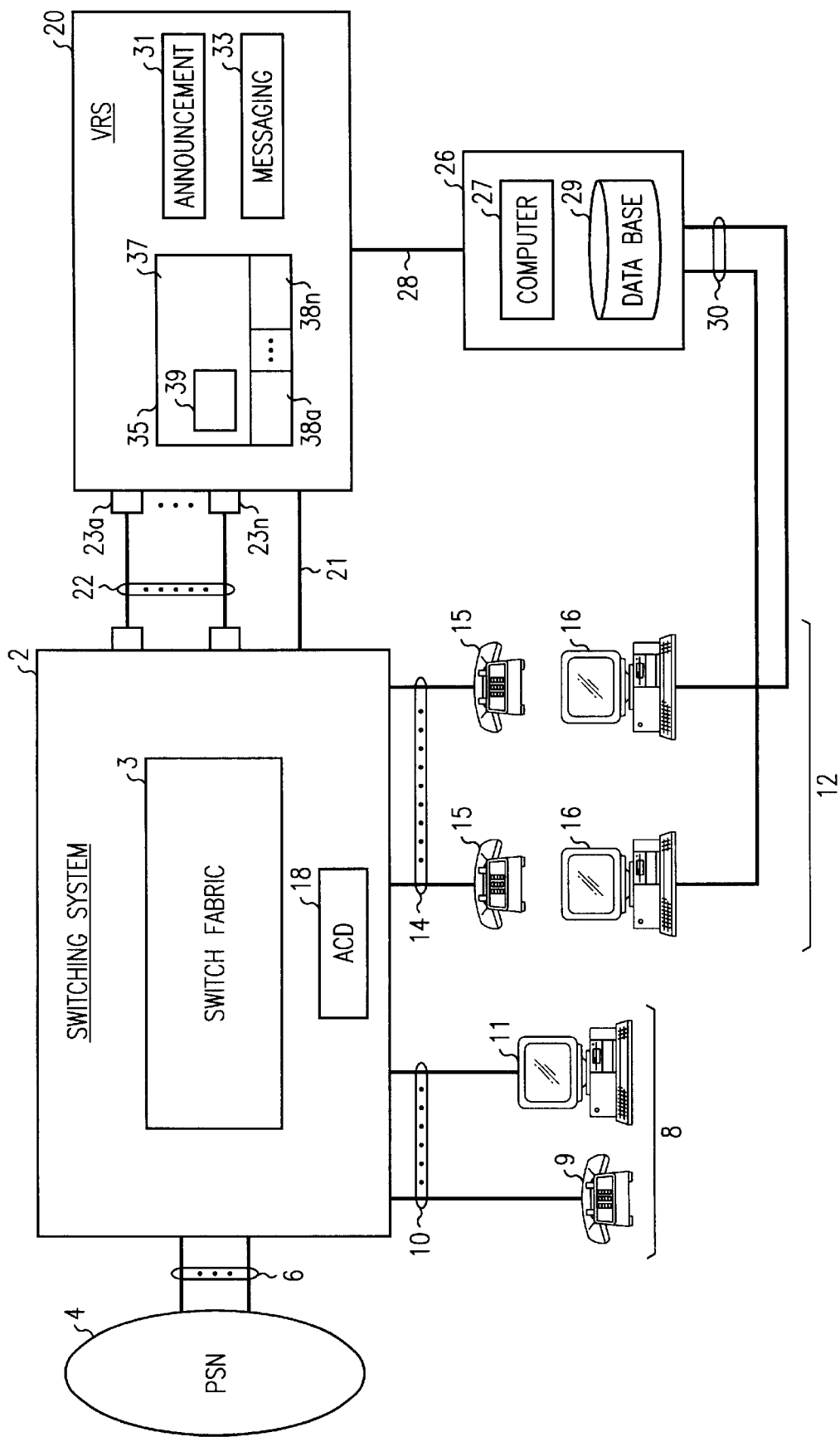
FIG. 1 is a block diagram of a communications network implementing the system of the invention.

Referring more particularly to FIG. 1, a communications network implementing the system of the invention is shown consisting of a switching system 2 such as the 5ESS® switching system manufactured and sold by Lucent Technologies Inc. Switching system 2 includes a switch fabric 3 that operates to switch voice and data through the network as is known in the art and is connected to other switching systems in the public switched network 4 over trunks 6. Switching system 2 hosts customer premise equipment 8 such as telephone 9, personal computer 11, facsimile machines, terminals (not shown) and the like over customer lines 10. Switching system 2 also hosts a plurality of agent stations 12 over customer lines 14 where agent stations 12 are associated with a particular service such as a help line, 800 number, customer service or the like. Each agent station 12 consists of a telephone set 15 and a terminal or computer 16 for accessing customer data. It will be appreciated that any similar system such as a multimedia terminal can be used as the agent station provided it allows the agent to answer calls and retrieve relevant data. Switching system 2 also supports an automatic call distribution (ACD) platform 18 such as the Pinnacle® ACD manufactured and sold by Lucent Technologies Inc. It will be understood that the ACD software functions to distribute calls to agents from call queues, provides load balancing and delay treatment as is known in the art. While in the illustrated embodiment the switching system 2 is shown with a distinct ACD 18, it is to be understood that the functionality of the ACD could be incorporated in the switch call processing platform, if desired.

A voice response system (VRS) 20, such as the Intuity™ CONVERSANT® voice information system manufactured and sold by Lucent Technologies Inc., is connected to switching system 2 over a plurality of analog voice lines 22 where the voice lines terminate at ports 23a . . . 23n on the VRS. Calls to switching system 2 are connected to the VRS 20 by the switch fabric of switching system 2 based on specific call conditions such as called number, automatic number identification (ANI), calling party number, directory number, time of day or the like. The VRS 20 is also connected to ACD 18 by Ethernet link 21 or other data interface for transmitting data between the ACD 18 and VRS 20. The VRS 20 includes an announcement platform 31 for providing voice announcements and a messaging platform 33 for receiving and recording messages and control unit 35 for controlling operation of the system including an applications program 37 for executing the steps of the invention as will be hereinafter described. Additional applications programs can co-reside as shown 38a–38n for performing other functions of the VRS 20.

Finally, a mainframe or server network 26 comprising a computer 27 and data base 29 is connected to VRS 20 over data link 28 and to each of agent stations 12 over data links 30. Data base 29 maintains records relevant to the service to be performed by the VRS 20 and agent stations 12. For example, if the VRS 20 and agents are controlled by a banking institution, data base 29 would maintain customer account information and the like. The specific data maintained in data base 27 will vary based on the particular application in which the system of the invention is used.

Figure 2:
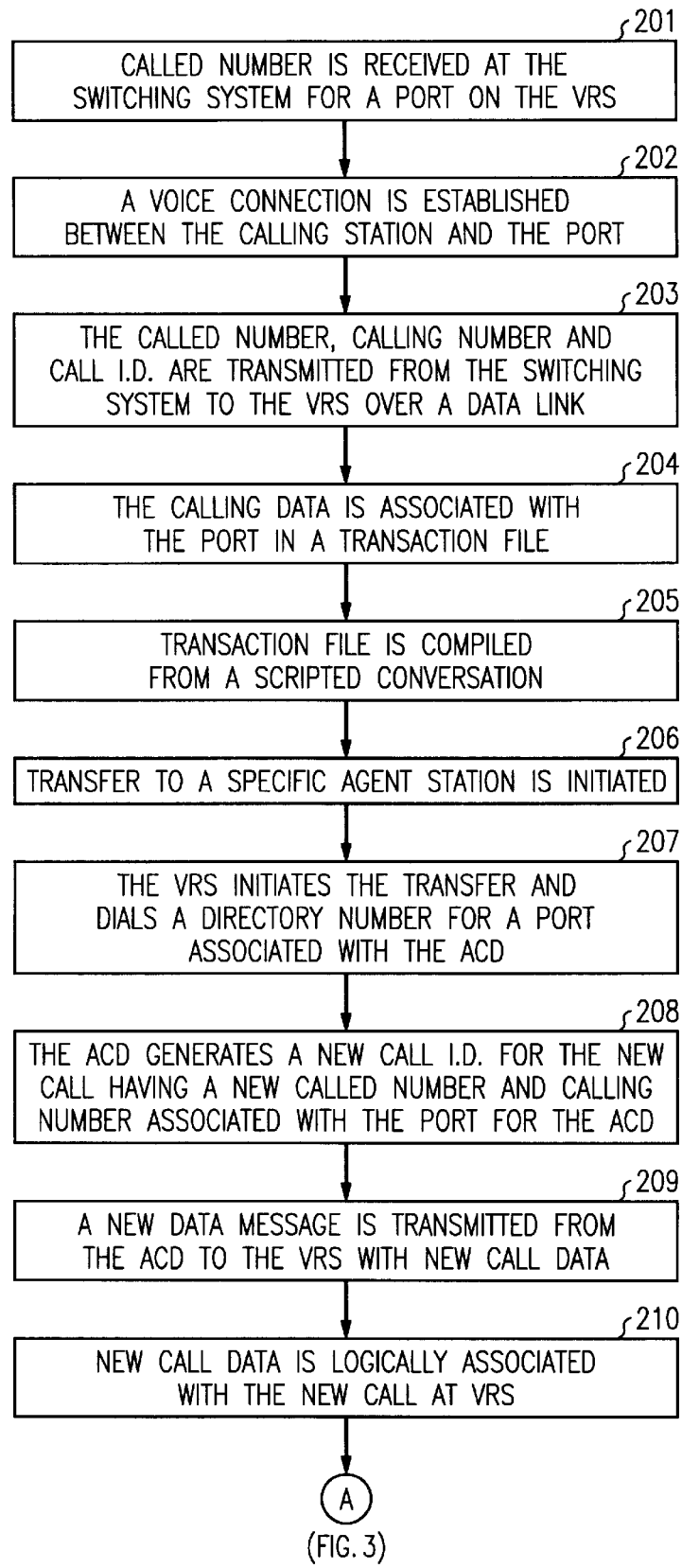
FIGS. 2 and 3 are flow charts showing the operational steps of the system of the invention.
Figure 3:
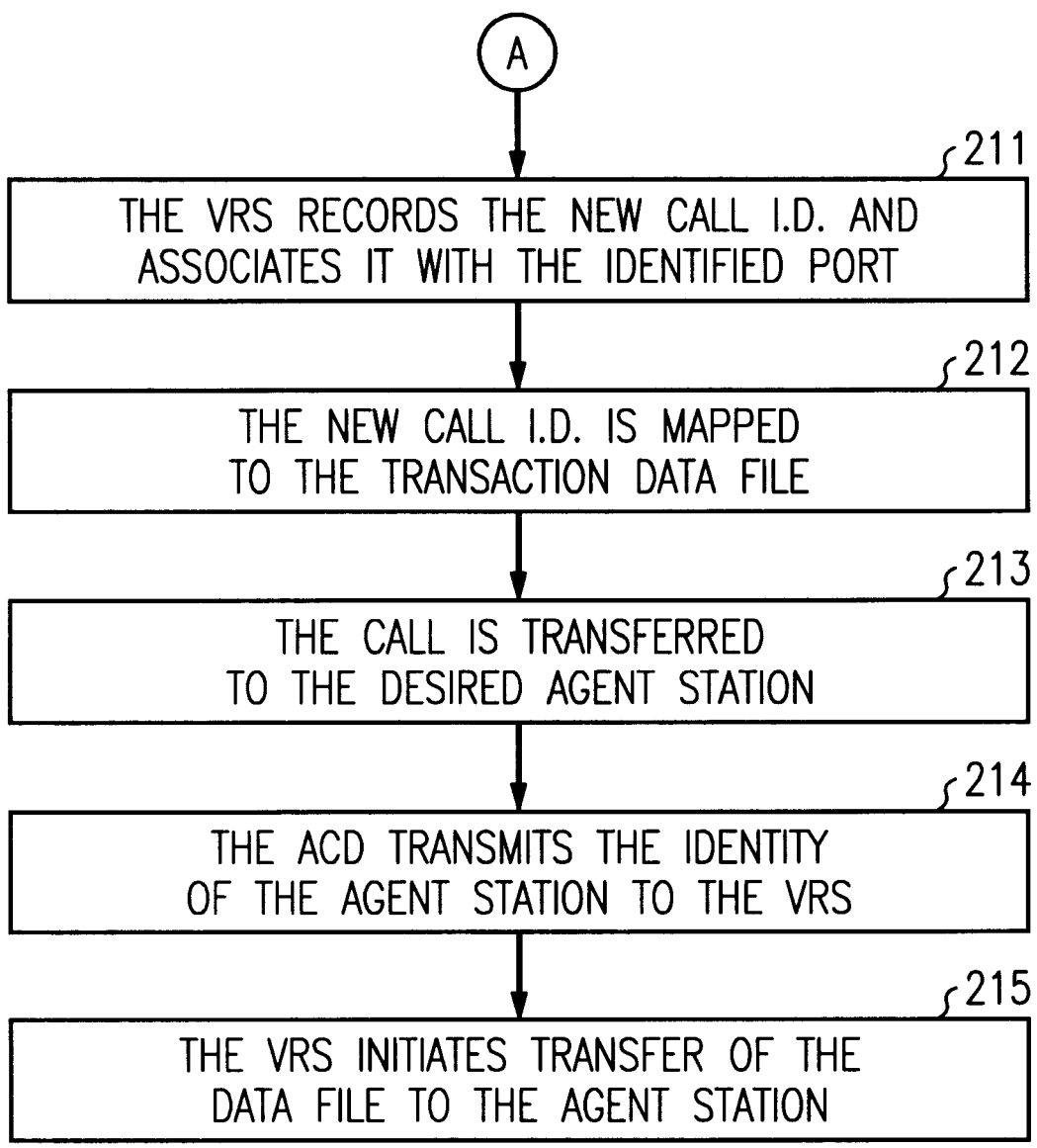

Operation of the system will now be described with respect to FIGS. 1 and 2. Assume that a calling party at telephone 9 dials a directory number (called number) that is processed by switch system 2 and that terminates at port 23a on VRS 20 (block 201). The switch system 2 establishes a voice connection between the telephone 9 and terminating port 23a on the VRS 20 via the switch fabric 3 over one of analog voice lines 22 (block 202). The switching system also invokes the ACD 18 software which transmits the calling data including calling number (i.e. the telephone number of the calling party), the called number (i.e. the telephone number for the port on VRS hosting the call) and a call identification number (call I.D.) for the call provided by ACD 18 to the applications program 37 in the VRS over Ethernet link 21 (block 203). The applications program 37 stores this calling data and logically associates it with the call terminating on port 23a in pending transaction file 39, where transaction file 39 is a memory location logically dedicated to the existing call (block 204). It should be noted that the called number could be for a multihunt group where any one of a number of ports could terminate the call as is known in the art. At this point, a voice connection is established between the calling party and the VRS 20. In some scenarios data provided at connection is sufficient to retrieve caller specific data and no further caller interaction is required. In the general case, however, the VRS 20 can conduct a scripted "conversation" with the calling party to obtain and provide further information. Typically, the VRS 20 instructs the calling party to dial digits or speak words from a selected menu that initiates the VRS 20 to perform predetermined activities. The VRS 20 obtains information from the calling party (e.g. name, social security number, account information or the like) and data from the mainframe 26 (e.g. calling party account information) and compiles transaction data for the call in file 39 (block 205). The VRS 20 responds to the calling party's requests using the transaction data. If the VRS 20 is unable to satisfactorily respond, it may be necessary to redirect the calling party to one of agent positions 12. The redirection may be initiated by the VRS or at the request of the calling party, such as by the calling party inputting "0". To initiate the redirection, the applications program 37 selects a particular agent station for handling the call (block 206). The agent station may be the next available agent or may be selected based upon specific information such as agent specialty.

Optionally, in the course of the transfer, information collected by the VRS 20 can be transmitted to the switching system 2 for the purpose of delivering that information to the selected agent telephone 15. Switching system 2, upon determining the validity of the request to transmit the data, sends the information to agent telephone 15 in the course of establishing the call connection in a format compatible with an optional visual display device in telephone 15. The VRS 20 initiates a redirection to the selected agent position. Upon initiation of the transfer request the pending transaction file is stored in mainframe or server network 26 or in memory of VRS 20 logically associated with the existing call. Specifically, VRS 20 initiates a switch hook flash to the switching system 2 and transmits a directory number for a port associated with ACD 18 (block 207). When this new call arrives at the ACD 18, the ACD generates a new call I.D. to identify the new call where the new calling number is the number of the originating port (i.e., port 23n) on VRS 20 and the new called number is the directory number to port associated with the ACD that terminates the call (block 208). A new data message is transmitted from the ACD 18 to the VRS 20 identifying the new call with the new call I.D., new calling number and new called number (block 209). The application program 37 in the VRS 20 logically associates the received call information with the new call that originated from the port 23n in VRS 20 (block 210). The VRS records the new call I.D. and associates it with the identified port 23n (block 211). The VRS transmits the call I.D. to the mainframe 26 where it is mapped to the transaction data (i.e. the pending transaction file 39 originally created between the calling party and VRS 20) associated with that port (block 212). Alternatively, the mapping of call identification to transaction may be maintained in the VRS.

The calling station 9 is then transferred to the desired agent position as is known in the art (block 213). The call may be queued pending availability of the agent. Once the connection to the agent is completed, the ACD 18 delivers a new data message to the VRS 20 that identifies the agent station to which the call having the new call I.D. was delivered (block 214). The VRS 20 initiates sending of the transaction data associated with that call to the selected agent station via data link 30 where it can be retrieved and displayed on monitor 16 (block 215). The transaction data is either sent from mainframe or server network 26 as illustrated or it can be sent directly from VRS 20 if VRS 20 maintains the transaction file.

It is possible that multiple calls may be queued at the ACD for the same port on the VRS. In such a situation identifying the call only with the call I.D. is insufficient to uniquely identify the call. In such a circumstance, the mainframe sends a code to the VRS that is translated into a DTMF signal by the VRS. The VRS transmits the code using DTMF signaling to the ACD where it is translated into a digital code number equivalent by the ACD tone decoder. The ACD then sends the code back to the VRS where it is associated with the call I.D. for that call. The code number and call I.D. are sent to the mainframe where they are mapped to the file for that call based on the code number.

It is to be understood that the above description is only of one preferred embodiment of the invention. Numerous other arrangements may be devised by one skilled in the art without departing from the scope of the invention. The invention is thus limited only as defined in the accompanying claims.

What is claimed is:

1. A method for processing a call to an adjunct device comprising the steps of:

extending a voice connection from a calling station to a port on an adjunct device via a switching system in response to receipt of a called number;

transmitting the called number and a call identification to the adjunct device over a data link;

storing the called number and call identification number logically associated with the port in a transaction file;

initiating transfer of the call by transmitting a new called number associated with a port on the switching system from the adjunct device to the switching system;

generating a new call identification for the new called number and storing said new call identification and new called number logically associated with the port on the switching system;

transmitting a data message from the switching system to the adjunct device identifying the new call identification and new called number;

associating the new call identification and new called number with the new call;

mapping the new call identification with the transaction file;

transferring the call to a station;

transmitting an identification of the station to the adjunct device; and transmitting the transaction file to the station.

2. The method of claim 1, further including the step of transmitting data from the transaction file to a display at the station via the switching system.

3. A system for processing calls to an adjunct comprising:

a switching system;

an adjunct device connected to the switching system for connecting a customer calling station to a port of said adjunct device in response to receipt of a called number over a voice channel and a separate data channel for transmitting call data;

means for logically associating the call data with a call at both the switching system and adjunct device;

means for storing transaction data for the call, said transaction data includes a call identification number logically associated with the port; and means for forwarding the transaction data to an agent station when the call is transferred from the adjunct device to the agent station;

wherein said forwarding includes means for initiating forwarding of the call by transmitting a new called number associated with the port on the switching system from the adjunct device to the switching system;

means for generating a new call identification for the new called number and storing said new call identification and new called number logically associated with the port on the switching system;

means for transmitting a data message from the switching system to the adjunct device identifying the new call identification and new called number;

means for associating the new call identification and new called number with the new call;

means for mapping the new call identification with the transaction data;

means for forwarding the call to a agent station;

means for transmitting an identification of the agent station to the adjunct device; and means for transmitting the transaction file to the agent station.

4. The method of claim 3, further including means for transmitting the transaction data to a display at the station via the switching system.

5. The system of claim 3, wherein the adjunct device is a voice response system.

6. The system of claim 3, wherein the voice channel comprises an analog line.

7. The system of claim 3, wherein the voice channel comprises a digital line.

8. The system according to claim 3, wherein the data channel constitutes an Ethernet link.

9. The system according to claim 3, wherein the means for forwarding the transaction data comprises a data link between the means for storing transaction data and the agent station.

10. The system according to claim 3, wherein the switching system includes an automatic call distribution platform.

11. The system according to claim 3, wherein the agent station is one of a plurality of agent stations.

* * * * *